(12) United States Patent
Samar

(10) Patent No.: US 7,606,788 B2
(45) Date of Patent: Oct. 20, 2009

(54) METHOD AND APPARATUS FOR PROTECTING PRIVATE INFORMATION WITHIN A DATABASE

(75) Inventor: Vipin Samar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 559 days.

(21) Appl. No.: 10/645,953

(22) Filed: Aug. 22, 2003

(65) Prior Publication Data

US 2005/0044059 A1  Feb. 24, 2005

(51) Int. Cl.
*G06F 7/00* (2006.01)

(52) U.S. Cl. .............................................. 707/3; 707/8

(58) Field of Classification Search ................ 707/204, 707/3, 2, 8–10, 200, 206; 709/206, 207, 709/204

See application file for complete search history.

(56) References Cited

U.S. PATENT DOCUMENTS

| | | | | |
|---|---|---|---|---|
| 4,930,073 | A * | 5/1990 | Cina, Jr. ...................... | 710/200 |
| 5,919,257 | A * | 7/1999 | Trostle ........................ | 726/22 |
| 6,154,879 | A * | 11/2000 | Pare et al. .................... | 705/35 |
| 6,167,433 | A * | 12/2000 | Maples et al. ............... | 709/204 |
| 6,366,950 | B1 * | 4/2002 | Scheussler et al. .......... | 709/206 |
| 6,763,460 | B1 * | 7/2004 | Hild et al. ................... | 713/161 |
| 6,928,428 | B1 * | 8/2005 | De Vries ..................... | 707/3 |
| 7,062,650 | B2 * | 6/2006 | Robbins et al. ............. | 713/167 |
| 2002/0016910 | A1 * | 2/2002 | Wright et al. ............... | 713/150 |
| 2002/0019849 | A1 * | 2/2002 | Tuvey et al. ................ | 709/206 |
| 2002/0169793 | A1 | 11/2002 | Sweeney | |
| 2003/0014394 | A1 | 1/2003 | Fujuwara et al. ........... | 707/3 |
| 2003/0084039 | A1 * | 5/2003 | Balogh ........................ | 707/3 |
| 2003/0159054 | A1 * | 8/2003 | Fauble et al. ............... | 713/189 |
| 2006/0129847 | A1 * | 6/2006 | Pitsos ......................... | 713/193 |

FOREIGN PATENT DOCUMENTS

| | | | |
|---|---|---|---|
| GB | 2386710 A | * | 9/2003 |
| WO | WO 01/18631 | * | 3/2001 |

OTHER PUBLICATIONS

Javvin, Information, Computer and Network Scurity Terms Glossary and Dictionary, MD5.*
Redhat, Red Hat Linux Reference Guide, Lightweight Directory Access Protocol (LDAP).*
Microsoft Press, Computer Dictionary, Lightweight Directionary Access Protocol (LDAP). 1997.*
Arnason E: "Personal Indentifiability in the Icelandic Health Sector Database" Technology 'Online! Sep. 3, 2002, XP002313129 University Warwick, Strathclyde University, UK ISSN: 1361-4169. Retrieved from the Internet: URL:elj.warwick.ac.uk/jilt/02-2/rtfs/arnason.rtf> retrieved on Jan. 10, 2005! section "4. Building a Key with Look-up Table" Section "4.1 Coding a Transformation of Names" table 3.
Publication: "Access control in a relational data base management system by query modification" by Stonebraker and Wong, Proc.ACM Ann. Conf. San Diego, CA, Nov. 1974, pp. 180-187.

* cited by examiner

*Primary Examiner*—Wilson Lee
(74) *Attorney, Agent, or Firm*—Park, Vaughan & Fleming LLP

(57) ABSTRACT

One embodiment of the present invention provides a system that facilitates protecting an item of private information in a database, wherein the item of private information is used as a key for retrieving data from the database. During operation, the system receives the item of private information and creates a hash of the item. The system then stores the hash in the database along with any associated information in a database record containing the hash.

12 Claims, 1 Drawing Sheet

METHOD AND APPARATUS FOR PROTECTING PRIVATE INFORMATION WITHIN A DATABASE

BACKGROUND

1. Field of the Invention

The present invention relates to databases. More specifically, the present invention relates to a method and an apparatus for protecting private information within a database.

2. Related Art

Many organizations collect personal private information from individuals for various reasons, and store the information in a database. If this information should fall into the wrong hands, the information could be used to the detriment of the individuals.

For example, many organizations use an individual's Social Security Number (SSN) as an identifier for an individual, and also as a primary key in their database. This can be a problem because SSNs are one of the primary pieces of information used for identity theft. These SSNs, along with other personal private information, aggregated in a database make a compelling target for hackers and thieves. Consequently, many localities have passed laws forbidding organizations from using SSNs or not allowing them to store SSNs in plain text.

In many cases the SSN is not even useful as information to the organizations. The organizations simply use the SSN as a unique key to look up information associated with an individual in a database. SSNs are convenient to use for this purpose because they are guaranteed to be unique and most individuals have their SSN committed to memory.

One way to protect private information is to encrypt the private information before it is stored in a database. In this way, even if someone illegally accesses the encrypted data, they will not be able to use it. However, if an application is able to access encrypted information within a database, the keys for encrypting and decrypting the data must be located somewhere on or near the server. Otherwise, the encrypted data would be useless to the application. Because the keys are located so that they can be accessed directly or indirectly by the application, the database administrator and possibly the programmers also have access to the keys, and consequently, have access to the encrypted data.

Hence, what is needed is a method and an apparatus for securing private information in a database without the problems listed above.

SUMMARY

One embodiment of the present invention provides a system that facilitates protecting an item of private information in a database, wherein the item of private information is used as a key for retrieving data from the database. During operation, the system receives the item of private information and creates a hash of the item. The system then stores the hash in the database along with any associated information in a database record containing the hash.

In a variation on this embodiment, creating the hash involves creating a SHA-1 or MD5 hash.

In a variation on this embodiment, the hash is created automatically by the database in a manner that is transparent to an application, which manipulates the private information.

In a variation on this embodiment, processing a query involving the item of private information involves creating a hash of the item of private information, and querying the database using the hash.

In a variation on this embodiment, the item of private information can include one of: a social security number, a driver's license number, a passport number, an email address, a person's name, and a person's mother's maiden name.

In a variation on this embodiment, multiple items of private information can be combined prior to creating the hash.

In a variation on this embodiment, creating the hash further involves checking a column attribute in the database to see if "privacy" is enabled, and if so creating the hash.

In a variation on this embodiment, the database is a Lightweight Directory Access Protocol (LDAP) database.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and does not include computer instruction signals embodied in a transmission medium.

Exemplary Databases

Figure 1:
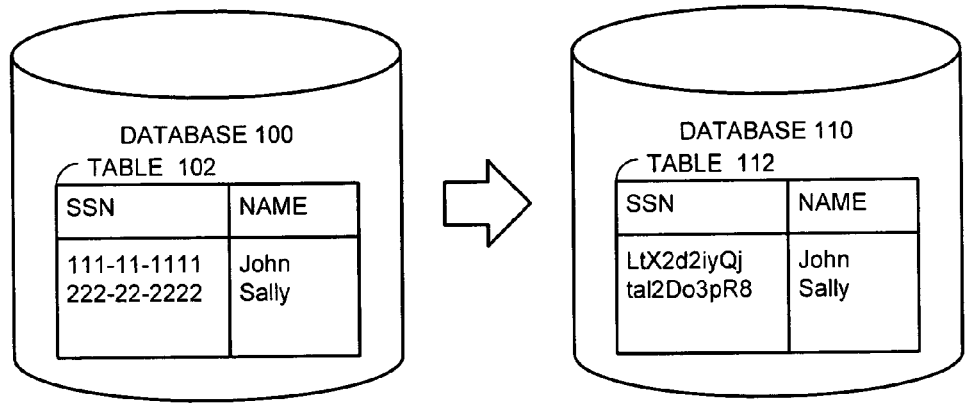
FIG. 1 illustrates exemplary databases in accordance with an embodiment of the present invention.

FIG. 1 illustrates exemplary databases 100 and 110 in accordance with an embodiment of the present invention. Database 100 and database 110 contain the same information. However, database 100 is an unencrypted database comprising table 102, whereas database 110 is a privacy-enabled database comprising table 112. As illustrated in FIG. 1, Social Security Numbers (SSNs) in table 102 are stored in plain text. Hence, anyone who has access to table 102 can view all of the information in table 102, including the SSNs. In contrast, table 112 contains the same data as table 102, but with hashed SSNs. Note that generating the hash can involve performing any one of a number of one-way functions, including SHA-1 and MD5.

Process of Protecting Private Information

Figure 2:
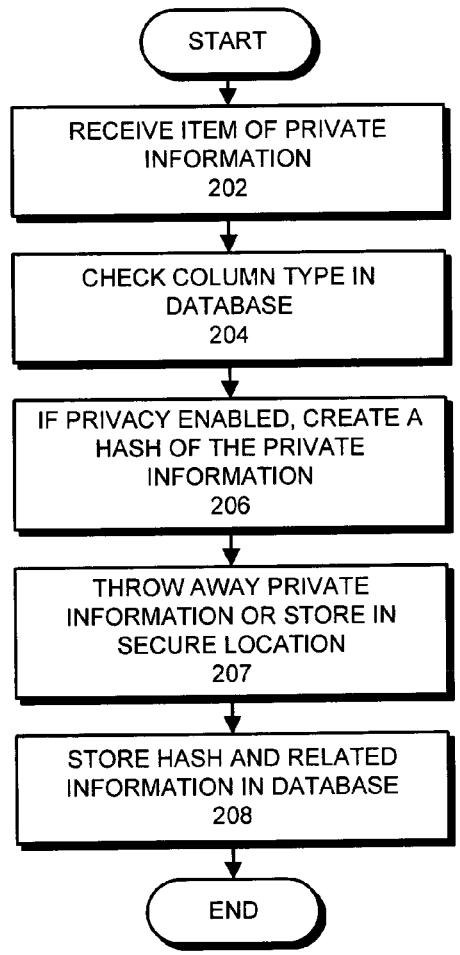
FIG. 2 presents a flowchart illustrating the process of protecting private information in accordance with an embodiment of the present invention.

FIG. 2 presents a flowchart illustrating the process of protecting private information in accordance with an embodiment of the present invention. The process starts when the system receives a piece of private information to be stored in the database (step 202). This piece of private information is typically a Social Security Number, Driver's License Number, or some other unique piece of information that is used as a key in the database to look up a record associated with an individual. Next, the system checks a type value for a column in which the information is to be stored in database 110 (step 204), and if this type value indicates that privacy is enabled for the column, the system creates a hash of the private information (step 206). At this point, the system also throws away the private information, or alternatively stores it in a secure location (step 207). As mentioned previously, any type of one-way function can be used to generate the hash. Also note that several pieces of private information can be combined into the hash. Once the hash is created, the hash and other related information is stored in a record in database 110 (step 206).

In one embodiment of the present invention, the hash is created automatically by the database in a manner that is transparent to the application. A new column attribute can be defined in the database instructing the database to always hash values upon inserting the values into the column. Note that performing this hashing automatically provides security without having to modify applications that access the database. These hash values can also be indexed to speed lookups. However, range searches become complicated. One possible method for performing a range search is to generate each value in the range, perform a hash on each value, and then look up each hash in the database.

Processing a Query

Figure 3:
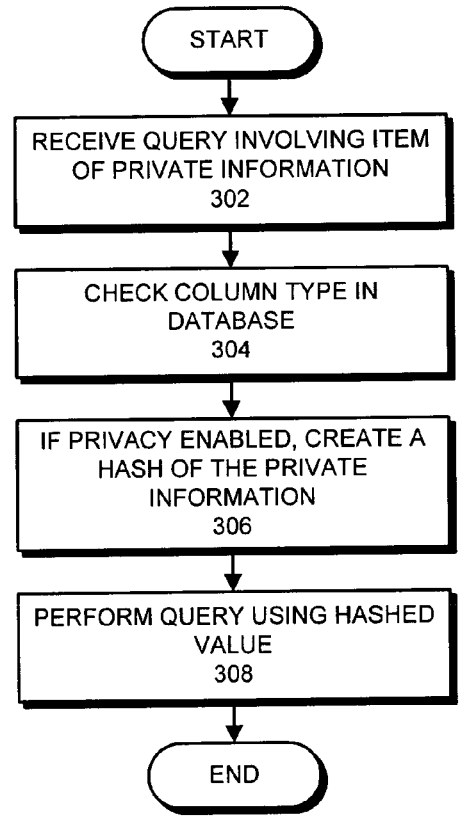
FIG. 3 presents a flowchart illustrating the processing of a query in accordance with an embodiment of the present invention.

FIG. 3 presents a flowchart illustrating the processing of a query in accordance with an embodiment of the present invention. The process starts when the system receives a query that involves the piece of private information (step 302). Next, the system checks the associated column type in database 110 (step 304). If this column type indicates that privacy is enabled, the system creates a hash of the piece of private information (step 306). The system then performs the query using the hash in place of the piece of private information (step 308). For example, the system can perform a "select" on the database where the hash is substituted in the "where" clause in place of the piece of private information. Note that as described previously, the hashing can take place at the database level in a manner that is transparent to the application. For example, the select statement might contain the private information in the "where" clause, and the database, knowing that the column referenced by the "where" clause is marked as privacy-enabled, would automatically hash the data before performing the lookup.

In one embodiment of the present invention, the hashing operations are not performed automatically, but are instead performed by a programmer. In this embodiment, the methods for checking if a column is privacy enabled and for creating the hashes are exposed to programmers through an API.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art.

For example, although the present invention is described in the context of a relational database, the present invention is not limited to relational databases. In general, the present invention can be applied to any type of database, including relational databases, hierarchical databases, centralized databases and distributed databases. In one embodiment of the present invention, the present invention is used to hash directory information stored in a Lightweight Directory Access Protocol (LDAP) database.

Additionally, the above disclosure is not intended to limit the present invention. The scope of the present invention is defined by the appended claims.

What is claimed is:

1. A method for protecting an item of private information in a database, wherein the method comprises:
   receiving the item of private information at a database in plain text, wherein the item of private information is used as a key for retrieving data from the database;
   creating a hash of the item of private information at the database, wherein creating the hash farther comprises checking a column attribute for a column, which stores the item of private information, in the database to determine that "privacy" is enabled for the column, and only upon privacy being enabled for the column, creating the hash, wherein the hash of the item of private information is created by the database in a manner that is transparent to an application which manipulates the private information, and wherein the hash is a one-way hash;
   storing the hash of the item of private information in the database, wherein the hash of the item of private information is a unique lookup key within the database, and wherein the item of private information does not exist in the database in plain-text form;
   creating an index based on the hash; and
   discarding the item of private information.

2. The method of claim 1, wherein creating the hash can include creating at least one of a Secure Hash Algorithm-1 (SHA-1) and a Message-Digest algorithm 5 (MD5) hash.

3. The method of claim 1, wherein processing a query containing the private information involves:
   receiving the item of private information;
   creating a hash of the item of private information; and
   querying the database using the hash of the item of private information.

4. The method of claim 1, wherein the item of private information can include one of:
   a social security number;
   a driver's license number;
   a passport number;
   an email address;
   a person's name; and
   a person's mother's maiden name.

5. The method of claim 1, wherein multiple items of private information can be combined prior to creating the hash.

6. The method of claim 1, wherein the database is a Lightweight Directory Access Protocol (LDAP) database.

7. A computer-readable storage medium storing instructions that when executed by a computer cause the computer to perform a method for protecting an item of private information in a database, wherein the method comprises:
   receiving the item of private information at a database in plain text, wherein the item of private information is used as a key for retrieving data from the database;
   creating a hash of the item of private information at the database, wherein creating the hash farther comprises checking a column attribute for a column, which stores the item of private information, in the database to determine that "privacy" is enabled for the column, and only upon privacy being enabled for the column, creating the hash, wherein the hash of the item of private information is created by the database in a manner that is transparent to an application which manipulates the private information, and wherein the hash is a one-way hash;

storing the hash of the item of private information in the database, wherein the hash of the item of private information is a unique lookup key within the database, and wherein the item of private information does not exist in the database in plain-text form;

creating an index based on the hash; and discarding the item of private information.

8. The computer-readable storage medium of claim 7, wherein creating the hash can include creating at least one of a Secure Hash Algorithm-1 (SHA-1) and a Message-Digest algorithm 5 (MD5) hash.

9. The computer-readable storage medium of claim 7, wherein processing a query containing the private information involves:

receiving the item of private information;

creating a hash of the item of private information; and querying the database using the hash of the item of private information.

10. The computer-readable storage medium of claim 7, wherein the item of private information can include one of:

a social security number;
a driver's license number;
a passport number;
an email address;
a person's name; and
a person's mother's maiden name.

11. The computer-readable storage medium of claim 7, wherein multiple items of private information can be combined prior to creating the hash.

12. The computer-readable storage medium of claim 7, wherein the database is a Lightweight Directory Access Protocol (LDAP) database.

* * * * *

UNITED STATES PATENT AND TRADEMARK OFFICE
CERTIFICATE OF CORRECTION

PATENT NO. : 7,606,788 B2
APPLICATION NO. : 10/645953
DATED : October 20, 2009
INVENTOR(S) : Vipin Samar Page 1 of 1

It is certified that error appears in the above-identified patent and that said Letters Patent is hereby corrected as shown below:

On the face page, in field (56), in column 2, under "Other Publications", line 1, delete "Scurity" and insert -- Security --, therefor.

On the face page, in field (56), in column 2, under "Other Publications", line 5, delete "Directionary" and insert -- Directory --, therefor.

On the face page, in field (56), in column 2, under "Other Publications", line 7, delete "Indentifiability" and insert -- Identifiability --, therefor.

On the face page, in field (56), in column 2, under "Other Publications", line 14, delete "data base" and insert -- database --, therefor.

In column 4, line 14, in claim 1, delete "farther" and insert -- further --, therefor.

In column 4, line 59, in claim 7, delete "farther" and insert -- further --, therefor.

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,606,788 B2
APPLICATION NO. : 10/645953
DATED : October 20, 2009
INVENTOR(S) : Vipin Samar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Twelfth Day of October, 2010

David J. Kappos
*Director of the United States Patent and Trademark Office*